United States Patent Office 3,535,275
Patented Oct. 20, 1970

3,535,275
ADHESIVE COMPRISING ANIMAL GLUE AND A THERMOPLASTIC POLYMER
Dixie E. Gilbert, Bartlesville, Okla., assignor to Phillips Petroleum Company, a corporation of Delaware
No Drawing. Filed Dec. 1, 1967, Ser. No. 687,161
Int. Cl. C08h 7/04
U.S. Cl. 260—6            4 Claims

ABSTRACT OF THE DISCLOSURE

A glue suitable for joining a polymer surface to another polymer surface or to a third material is made by mixing animal glue and a polymer similar to or identical to the polymer which is being joined.

BACKGROUND OF THE INVENTION

This invention relates to an adhesive formulation which will adhere to untreated plastic surfaces.

While some plastic surfaces can be joined to each other or to third materials with conventional adhesive formulations, many plastics, particularly some of the newer plastics present a serious problem with regard to adhesion. For instance, polymers of mono-1-olefins, such as polymers and copolymers of ethylene, propylene, and butene-1 cannot be easily joined to each other or to third materials with conventional adhesive formulations. Thus in order to join two polyolefin surfaces together or in order to affix a paper label or the like to a polyolefin surface, it has generally been necessary to treat the surface of the polyolefin prior to application of the adhesive. By treating the surface with chromic acid or by giving it a flame treatment or an electrical discharge treatment it is possible to achieve a polyolefin surface which can be joined to other materials with certain adhesive formulations. This however entails the extra step of treating the polymer surface. This is a particular problem in connection with blow molded bottles which have attained a high degree of commercial success in recent years, since in many instances the manufacturer desires to affix a paper label to the bottle. Because of the highly competitive nature of this field and the fact that such bottles are usually discarded after one use, it is apparent that the slight extra cost necessitated by the surface treating step is a serious drawback.

SUMMARY

It is an object of this invention to provide an adhesive mixture which will adhere to a normally solid thermoplastic substrate. It is a more specific object of this invention to provide an adhesive mixture which will adhere to untreated polyolefin surfaces.

In accordance with this invention, an adhesive formulation which will adhere to plastic surfaces comprises a mixture of animal glue and a polymer similar to or identical to that to which the adhesive is to be applied.

DESCRIPTION OF THE PREFERRED EMBODIMENTS

The instant invention is applicable to the joining of materials to any plastic material such as poly(vinyl chloride), nylon, polyester, olefin polymers and the like. Because of the fact that olefin polymers cannot be joined to other materials easily with conventional adhesive formulations, it is of particular utility for use with polymers of mono-1-olefins having 2–8 carbon atoms per molecule, more specifically polymers of at least one mono-1-olefin selected from the group consisting of ethylene, propylene, and butene.

This adhesive formulation is useful for joining two polymer surfaces together, or for joining a third material to a polymer surface. It is of particular utility for joining labels made of paper to blow molded or thermoformed bottles, jars, and the like. This, of course, is not to exclude the adhesive formulations of the instant invention from general use as an adhesive in applications not involving plastics.

While the surface of the plastic to be joined can be surface treated if desired, the instant invention is of primary utility for use on untreated surfaces where conventional adhesive formulations are unsuitable.

The adhesive formulation of the instant invention comprises two essential components, (1) animal glue and (2) a polymer.

The animal glue can be any extract from animal tissue which is conventionally referred to as animal glue. It is the hydrolysis product of collagen. It is proteinaceous in nature as opposed to being of hydrocarbon nature; glues of carbohydrate composition such as mucilages are not effective in the instant invention. Examples of the hydrolysis product of collagen suitable for use in the instant invention include hide glues, skin glues, crome glues, coney glues, technical gelatin, bone glue, green bone glue, extracted bone glue, dry bone glue, fish glue, and the like. These glues are commercially available.

For instance, commercially available liquid glues generally comprising about 35 weight percent water, 45 to 55 weight percent animal glue, and 10 to 20 weight percent liquefying agent can be used in the practice of the instant invention. Suitable liquefying agents include urea, thiourea, sodium naphthalene sulfonates, ethylene chlorohydrin, chloral hydrate, ammonium thiocyanate, and the chlorides or nitrates of calcium, magnesium, or zinc. Cosolvents such as glycerin can be used along with the water in the animal glue formulation. Animal glue formulations not employing a liquefying agent will generally have a lower concentration of the animal glue and a higher concentration of solvent and are more brittle. Generally the animal glue formulation will contain from 1 to 80, preferably 5 to 60 weight percent glue. The upper limit will generally depend on the solubility of the animal glue in the aqueous medium but in any event will be at least 1 percent.

The polymer forming the second component of the glue formulation, is preferably in the form of a dispersion. This polymer is preferably identical to or at least similar to the polymer which is to be joined by the ultimate adhesive formulation. For instance if the adhesive formulation is to be used to affix a label to a poly(vinyl chloride) bottle then the polymer dispersion should be a dispersion of poly(vinyl chloride). If the adhesive formulation is to join a label or the like to a polyethylene bottle then the polymer dispersion should be a dispersion of polyethylene or a similar material such as polypropylene, an ethylene-butene copolymer or the like. Water is the preferred material in which the polymer dispersion is made although other diluents can be used. Thus this dispersion may be of any normally solid thermoplastic polymer, as opposed to a rubber or thermoset plastic. Exemplary thermoplastic polymers in addition to the vinyl and olefin polymers are: acrylic polymers; cellulosic polymers; nylon; polystyrene; polycarbonate; acetal polymers and the like.

The particle size of the polymer in the dispersion can vary over relatively wide ranges, although in general a relatively small particle size is preferred so as to attain a better dispersion. Generally the particle size of the polymer forming the dispersion will be less than 25 mesh, preferably less than 100 mesh. By mesh is meant the standard U.S. sieve series, United States Bureau of Standards, Standard Screen Series, 1919. With polyethylene it is difficult to obtain particles smaller than about 450 mesh With poly(vinyl chloride) dispersions with a particle size of 0.2 micron are commercially available and are ideally suited for the practice of this invention.

While in the preferred embodiment the polymer is dispersed in a non-solvent, it is also within the scope of the invention to utilize a polymer solution as the second component of the adhesive formulation. For instance, instead of a PVC dispersion in water a PVC solution in a solvent such as methyl ethyl ketone can be admixed with an animal glue to form the adhesive formulation of the instant invention. It is preferred however to use a water solution of the animal glue and a water dispersion of the polymer in order to obtain a more homogeneous final adhesive formulation.

The concentration of polymer in the dispersion can vary widely. Generally the percent of polymer in the water or other diluent will be within the range of 10 to 90, preferably about 33 to 67 weight percent.

Based on the solids, that is discounting the solvent and diluent (if any), the final adhesive formulation will preferably contain from about 1 to about 75 weight percent of the animal glue and about 99 to 25 percent of the polymer, more preferably about 5 to 25 weight percent animal glue and 95 to 75 percent polymer. The final adhesive formulation will generally have from 1.3 to 90, preferably 14 to 67 weight percent combined animal glue and polymer in an aqueous medium.

It is also within the scope of the invention to mix dry animal glue, dry polymer powder and the solvent and/or diluent such as water all at the same time to produce the adhesive formulation of the instant invention. Other ingredients such as a dispersing agent for the polymer, a liquefying agent for the animal glue and the like can also be added at this time if desired for the particular formulation.

It is to be noted that: whether the polymer is in the form of a water dispersion, which is the preferred embodiment; and whether the animal glue is in the form of a simple solution in water or in solution in water and a co-solvent; or even whether separate solutions of animal glue and polymer dispersions (or solutions) are mixed, or whether dry animal glue, dry polymer and water are added together; in all cases the final adhesive formulation contains some water since water is the only true solvent for animal glue. Thus the final adhesive formulation is always in an aqueous medium in that at least some water is present either alone or in conjunction with other solvents and/or diluents.

In the following examples the term "animal glue" is used to denote a commercial glue formulation, this formulation being approximately 50 weight percent animal glue in water. The term "PVC dispersion" refers to a 50 weight percent dispersion of PVC in water, the particle size of the PVC being approximately 0.2 micron. The term "polyethylene dispersion" refers to a 50 weight percent dispersion of polyethylene in water, said polyethylene having a particle size such that 95 percent passes through a 100 mesh screen and 25 percent passes through a 325 mesh screen. This polymer had a melt index (ASTM D 1238–62T, Condition E) of 0.44 and a density (ASTM D 1505–63T) of 0.96. Ten weight percent mixtures of the animal glue (in water) with 90 weight percent of the respective polymer dispersions were prepared and applied to blow molded bottles made of PVC and polypropylene respectively. One-inch wide paper labels were applied to the bottles by means of this adhesive and the adhesive allowed to dry. A portion of the label was bent upward so as not to contact the bottle. This portion of the label was placed in a jaw of an Instron Tensile Tester and the pull in pounds required to remove the label was recorded.

EXAMPLE

| Run No. | Adhesive formulation | Substrate | Pounds pull to remove label |
|---|---|---|---|
| Control 1 | Animal glue alone | PVC | 1 0 |
| Control 2 | PVC dispersion alone | PVC | 1 0 |
| 1 | Animal glue plus PVC dispersion | PVC | 2 60 |
| 2 | do | Polyethylene | (3) |
| Control 3 | Animal glue alone | do | 1 0 |
| Control 4 | Polyethylene dispersion alone | do | 1 0 |
| 3 | Animal glue plus polyethylene dispersion | do | 2 60 |
| 4 | do | do | 2 60 |
| Control 5 | Mucilage plus PVC dispersion | PVC | 1 0 |
| Control 6 | Animal glue plus interpolymer latex.4 | Polypropylene | (5) |

1 Label fell off without being pulled.
2 Paper tore before adhesive gave away.
3 Adhesion varied widely from sample to sample, generally well below 60 lbs.
4 Commercial latex house paint.
5 Slight adhesion, but too low to measure.

A comparison of Controls 1 and 2 with Run 1 shows that each of the components separately is totally ineffective as an adhesive, whereas the combination, surprisingly, is exceptionally effective. As can be seen by comparison of Runs 1 and 2 the adhesive formulation is far more effective when the polymer dispersion is identical to that of the polymer substrate than when the polymer dispersion is of a polymer totally different from the substrate.

Even more remarkable is the comparison of Controls 3 and 4 with Run 3 where it is shown that animal glue alone results in no adhesion; the polyethylene dispersion alone results in no adhesion; but the combination of animal glue and the polyethylene dispersion results in excellent adhesion. This is particularly remarkable because polyethylene substrate was not print treated in any way, that is it was not flame treated, treated to a corona discharge, or chromic acid or the like. As is well known in the art it is very difficult to find anything which will adhere to untreated polyolefin surfaces. A comparison of Runs 3 and 4 reveals that equally good results are obtained when the polymer dispersion is identical to that of the substrate or very similar to that of the substrate. That is, a PVC dispersion gave an adhesive formulation which exhibited only mediocre results on a totally dissimilar material such as polyethylene as shown by Run 2. However excellent results were obtained with the adhesive formulation containing a polyethylene dispersion on both polyethylene and a similar material, polypropylene. As can be seen from Control 5 an ineffective adhesive formulation is attained when a mucilage (a carbohydrate of the vegetable origin) is substituted for the animal glue. Also ineffective was latex from a commercial water base house paint formulation.

Applicant has no explanation for this remarkable synergistic effect. It is surprising to find anything which will adhere to a polyolefin surface, but even more remarkable that a combination of two simple materials such as animal glue and a polymer dispersion, neither of which is effective by itself, will work so well.

While this invention has been described in detail for the purpose of illustration it is not to be construed as limited thereby but is intended to cover all changes and modifications within the spirit and scope thereof.

I claim:

1. An adhesive formulation comprising a mixture of (A) 1 to 75 weight percent of animal glue and (B) 99 to 25 weight percent of a normally solid thermoplastic polymer, selected from the group consisting of polymers of at least one mono-1-olefin having from 2 to 8 carbon atoms per molecule, poly(vinyl chloride), nylon, and polystyrene, said mixture being in an aqueous medium in a concentration such that the weight percent of said mixture based on the weight of said aqueous medium is between 1.3 and 90.

2. The formulation according to claim 1 wherein said component (A) is present in an amount within the range of 5 to 25 weight percent, said component (B) is present in an amount within the range of 95 to 75 weight percent, and the concentration of said mixture based on said aqueous medium is between 14 and 63 weight percent.

3. The formulation according to claim 1 wherein said normally solid thermoplastic polymer is selected from the group consisting of poly(vinyl chloride) and polymers of at least one mono-1-olefin having 2 to 8 carbon atoms per molecule.

4. A method of preparing an adhesive formulation suitable for joining items to a normally solid thermoplastic substrate of a polymer selected from the group consisting of polymers of at least one mono-1-olefin having from 2 to 8 carbon atoms per molecule, poly(vinyl chloride), nylon, and polystyrene, comprising combining (A) a solution of at least 1 weight percent animal glue in an aqueous medium with (B) a dispersion of 10 to 90 weight percent of a normally solid thermoplastic polymer selected from the group consisting of polymers of at least one mono-1-olefin having from 2 to 8 carbon atoms per molecule, poly(vinyl chloride), nylon, and polystyrene, in an aqueous medium, the particular concentrations of said components (A) and (B) and the ratio of said components (A) and (B) being chosen so that the weight percent of said combined components (A) and (B) based on the weight of said aqueous medium is between 1.3 and 90.

References Cited
UNITED STATES PATENTS

| | | | |
|---|---|---|---|
| 3,011,985 | 12/1961 | Breslouf et al. | 260—8 |
| 3,100,760 | 8/1963 | Brown et al. | 161—252 |
| 3,375,121 | 3/1968 | Bildusas | 260—8 |

FOREIGN PATENTS

| | | |
|---|---|---|
| 506,777 | 10/1954 | Canada. |
| 449,782 | 7/1936 | Great Britain. |

WILLIAM H. SHORT, Primary Examiner

E. WOODBERRY, Assistant Examiner

U.S. Cl. X.R.

156—328; 260—8